(12) United States Patent
Kwak (10) Patent No.: US 10,768,689 B2
(45) Date of Patent: Sep. 8, 2020

(54) SYSTEM AND METHOD FOR PROVIDING VIRTUAL REALITY CONTENTS BASED ON BODY INFORMATION OBTAINED FROM USER

(71) Applicant: Samsung C&T Corporation, Seoul (KR)

(72) Inventor: Dong Hoon Kwak, Seoul (KR)

(73) Assignee: SAMSUNG C&T CORPORATION, Seoul (KR)

( * ) Notice: Subject to any disclaimer, the term of this patent is extended or adjusted under 35 U.S.C. 154(b) by 469 days.

(21) Appl. No.: 15/250,968

(22) Filed: Aug. 30, 2016

(65) Prior Publication Data

US 2017/0285731 A1 Oct. 5, 2017

(30) Foreign Application Priority Data

Apr. 4, 2016 (KR) .................. 10-2016-0041153

(51) Int. Cl.
*G06F 3/01* (2006.01)
*G09G 5/00* (2006.01)

(52) U.S. Cl.
CPC .............. *G06F 3/011* (2013.01); *G06F 3/012* (2013.01); *G06F 3/013* (2013.01); *G06F 3/017* (2013.01); *G09G 5/003* (2013.01); *G09G 2354/00* (2013.01)

(58) Field of Classification Search
CPC .......... G06F 3/011; G06F 3/017; G06F 3/012; G06F 3/013; G06F 3/1431; G06F 3/01; G06F 3/015; G09G 5/003; G09G 2354/00; G09G 2380/08; G09G 3/003; G09G 2360/04; G02B 27/01
See application file for complete search history.

(56) References Cited

U.S. PATENT DOCUMENTS

2013/0336629 A1* 12/2013 Mulholland ............. H04N 9/87
 386/230
2014/0213361 A1* 7/2014 Zhang ..................... G06F 3/011
 463/31
2015/0306340 A1* 10/2015 Giap .................... A61B 1/0005
 600/301

FOREIGN PATENT DOCUMENTS

| JP | 2001-175883 A | 6/2001 |
| KR | 10-2012-0096970 A | 9/2012 |
| KR | 10-2012-0132283 A | 12/2012 |
| KR | 10-2014-0015678 A | 2/2014 |

* cited by examiner

*Primary Examiner* — Premal R Patel
(74) *Attorney, Agent, or Firm* — Bacon & Thomas, PLLC

(57) ABSTRACT

There is provided a virtual reality (VR) contents providing system. The system includes a storage unit, a VR contents playing device, a sensor and a control unit. The storage unit stores a plurality of VR contents. The VR contents playing device provides a VR content among the VR contents. The sensor measures biometric information of a user of the VR contents playing device. The control unit is configured to receive the biometric information from the sensor, calculate reaction value for the user based on the biometric information every predetermined time interval, determine property information for a VR content to be played based on the reaction value, and control the VR contents playing device to play its VR content having the determined property information.

12 Claims, 6 Drawing Sheets

| CONTROL GESTURE | COMMAND |
|---|---|
| BLINK ONCE | CLICK |
| BLINK TWICE | DOUBLE-CLICK |
| EYES CLOSED LONG AND THEN OPEN | EYES CURRENTLY TOWARD THE FRONT SIDE |
| NOD HEAD UP AND DOWN ONCE | PLAY |
| NOD HEAD UP AND DOWN TWICE | STOP |
| HEAD MOTION TO RIGHT TWICE | FAST MOTION |
| HEAD MOTION TO LEFT TWICE | SLOW MOTION |

SYSTEM AND METHOD FOR PROVIDING VIRTUAL REALITY CONTENTS BASED ON BODY INFORMATION OBTAINED FROM USER

CROSS-REFERENCE TO RELATED APPLICATION

This application claims the benefit of Korean Patent Application No. 10-2016-0041153, filed on Apr. 4, 2016, which is incorporated herein by reference in its entirety.

TECHNICAL FIELD

The present disclosure relates to system and a method for determining virtual reality contents to be provided in consideration of user's reaction to virtual reality contents and providing the user with the determined virtual reality contents.

BACKGROUND

By a virtual reality technology, virtual reality contents which are composed of 3D (3-dimensional) graphics are provided to cybernauts (hereinafter, the term of 'cybernaut' has the same meaning with the term of 'user'). There are many virtual reality technologies: for example, making 3D images by using 2D images which are captured toward all the directions with reference to a camera and making a head mounted display (HMD), 3D glasses and/or haptic sensor which delude the cybernauts as if they are in a real environment cybernauts and so on.

Figure 1A:
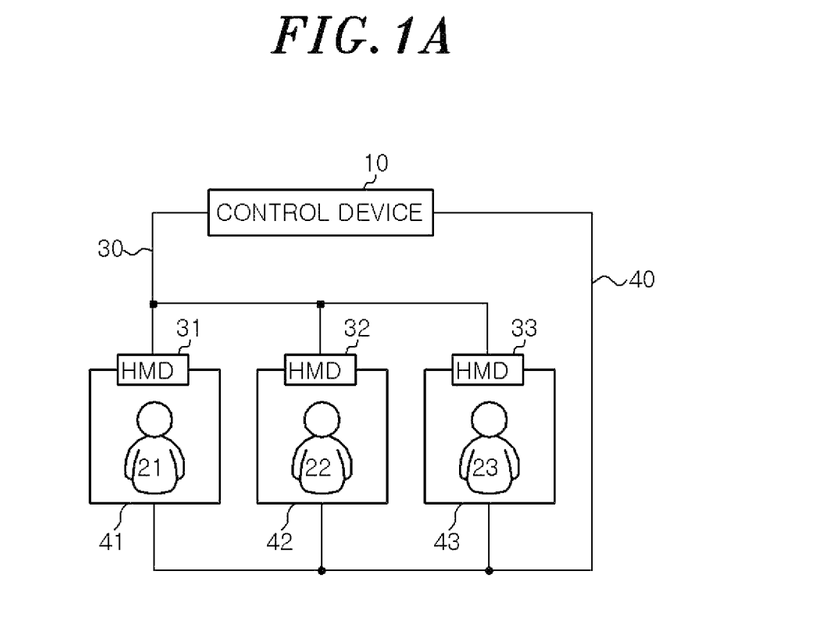
FIG. 1A shows an exemplary system including virtual reality (VR) contents playing devices, motion simulator and a control device.

The technology which provides cybernauts with both of the motions and the haptic sensation will be described in more detail. FIG. 1A is an exemplary system for providing cybernauts who experience virtual reality contents with images and motions related to the virtual reality contents. Referring to FIG. 1A, each of virtual reality (VR) contents playing devices 31 to 33 for providing VR contents, for example, an HMD is provided to each of cybernauts 21 to 23.

In addition, each of motion simulators 41 to 43 for providing motions related to virtual reality contents is provided to each of the cybernauts 21 to 23. As used herein, the motion simulators 41 to 43 may be a type of a seat in which the cybernaut is seated, and may provide motions synchronized with the VR contents provided by the VR contents playing devices 31 to 33. In the case of virtual reality contents related to images of riding a roller coaster, for example, the motion simulator may provide the cybernaut by changing the seat's posture in motion synchronization with the images of the roller coaster going upward or downward.

Figure 1B:
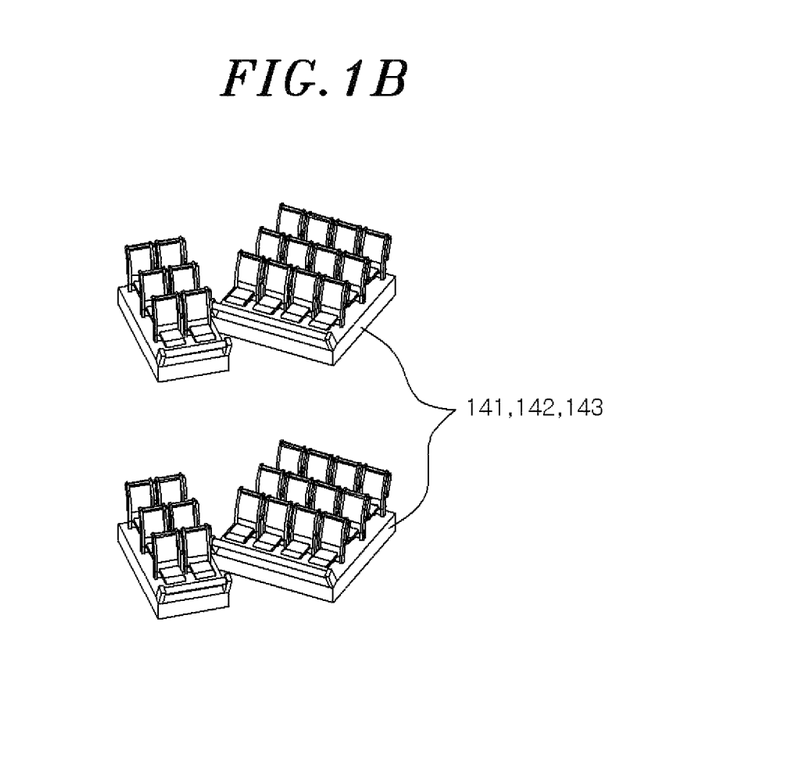
FIG. 1B illustrates an example of motion simulators.

As shown in FIG. 1A, one cybernaut may be seated in one motion simulator, or a plurality of cybernauts may be seated in one motion simulator (41 to 43) as illustrated in FIG. 1B.

The VR contents playing devices 31 to 33 and the motion simulator 41 to 43 are connected to the control device 10 shown in FIG. 1A. The control device 10 controls the VR contents playing devices 31 to 33 and the motion simulators 41 to 43 to be synchronized with each other. By the synchronization by the control device 10, the images and the motions are synchronized with each other to be provided to the cybernauts 21 to 23.

The images provided to the cybernauts 21 to 23 are identical each other. In addition, since the motion simulators 41 to 43 provide motions synchronized with the images to the cybernauts 21 to 23, the motions provided to the cybernauts 21 to 23 are also identical to each other. That is, virtual reality contents of the same images and the same motions are provided to the plurality of cybernauts 21 to 23, respectively.

SUMMARY

In view of the above, the present disclosure provides a technology for determining virtual reality contents to be provided in consideration of user's reaction to virtual reality contents and providing the user with the determined virtual reality contents.

However, it should be noted that the objects to be achieved by the present disclosure are not limited to those described above.

In accordance with the present disclosure, there is provided a virtual reality (VR) contents providing system. The system includes: a storage unit for storing a plurality of VR contents, each of the VR contents having at least one property information thereof; a VR contents playing device for providing a VR content among the VR contents; a sensor for measuring biometric information of a user of the VR contents playing device; and a control unit configured to receive the biometric information from the sensor, calculate reaction value for the user based on the biometric information every predetermined time interval, determine property information for a VR content to be played based on the reaction value, and control the VR contents playing device to play its VR content having the determined property information.

In accordance with the present disclosure, there is provided a virtual reality (VR) contents providing method. The method may be performed by VR contents providing system having VR contents playing device and sensor. Further, the method includes: providing a user with a VR content among a plurality of VR contents, each of the VR contents having at least one property information thereof; measuring biometric information of the user; calculating reaction value for the user based on the measured biometric information every predetermined time interval; determining property information for VR content to be played based on the reaction value; and controlling the VR contents playing device to play its VR content having the determined property information.

In accordance with embodiments, the reactions of a plurality of cybernauts who experience virtual reality contents can be individually analyzed on the basis of their reactions, and each of the plurality of cybernauts can be provided with optimum virtual reality contents based on their analyzed reactions.

Further, the cybernauts can control or operate the virtual reality contents provided to them just by their own body motion without additional operation.

DETAILED DESCRIPTION

The advantages and features of exemplary embodiments of the present disclosure and methods for accomplishing them will be clearly understood from the following description of the embodiments taken in conjunction with the accompanying drawings. However, the present disclosure is not limited to those embodiments and may be implemented in various forms. It should be noted that the embodiments are provided to make a full disclosure and also to allow those skilled in the art to know the full scope of the present disclosure. Therefore, the present disclosure will be defined only by the scope of the appended claims.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on user's or operator's intention or practice. Accordingly, the definition may be made on the basis of the content throughout the specification.

Figure 2:
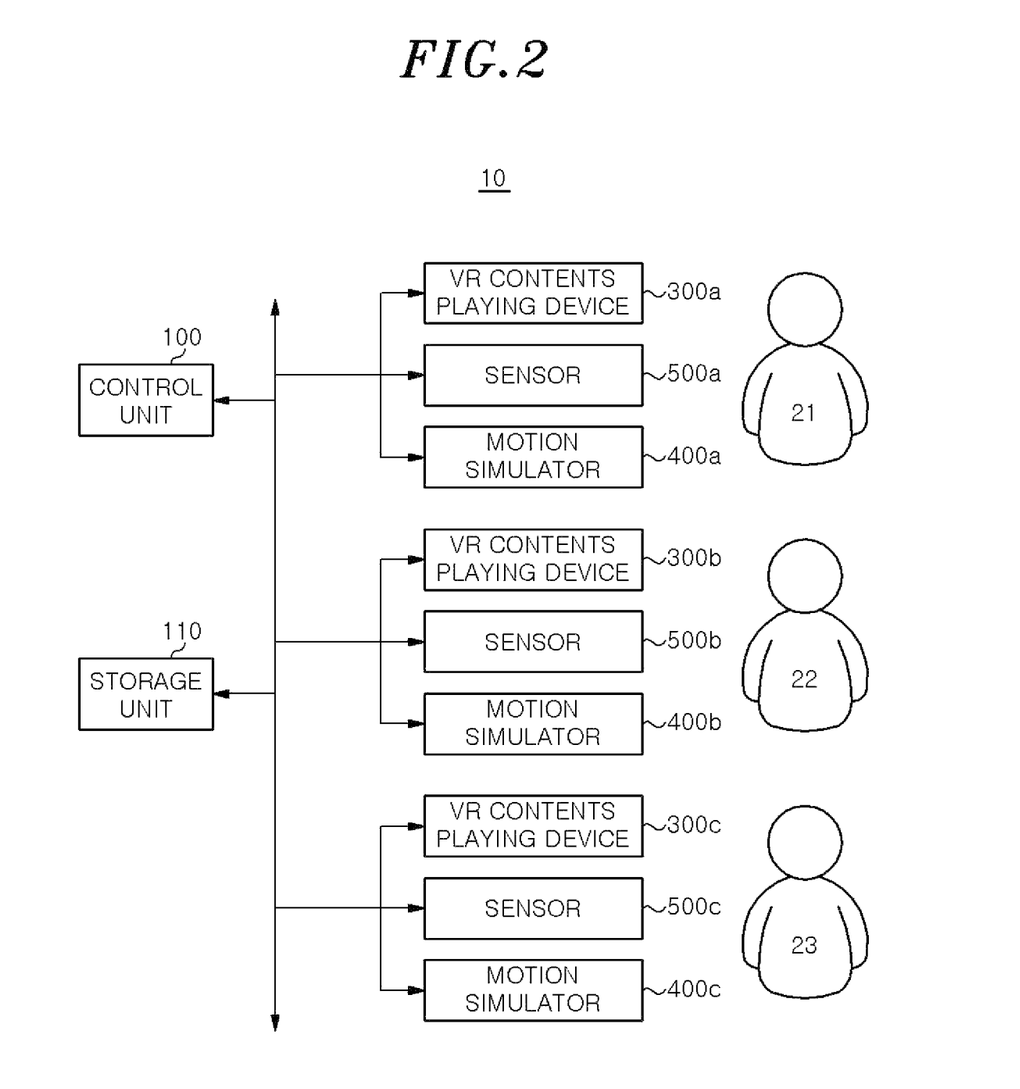
FIG. 2 depicts an exemplary system including VR contents playing devices, sensors, motion simulators, a storage unit and a control unit in accordance with an embodiment.

FIG. 2 depicts an exemplary virtual reality (VR) contents providing system in accordance with an embodiment. The system 10 includes VR contents playing devices 300a to 300c, sensors 500a to 500c, motion simulators 400a to 400c, a storage unit 110 and a control unit 100 in accordance with an embodiment.

Referring to FIG. 2, the VR contents playing devices 300a to 300c (hereinafter, also collectively referred to as a VR contents playing device 300) provide virtual reality contents to cybernauts 21 to 23 (hereinafter, also collectively referred to as a cybernaut 20). The VR contents playing device 300 may include or be, for example, an HMD (Head Mounted Display). As shown in FIG. 2, each of VR contents playing devices 300a to 300c is assigned to each of the cybernauts 21 to 23.

The motion simulators 400a to 400c (hereinafter, also collectively referred to as a motion simulator 400) provide motions related to virtual reality contents to the cybernaut 20. The motion simulator 400 may be, for example, a type of a seat in which the cybernaut is seated.

The motion simulator 400 provides motions to the cybernaut 20. In this case, the motions are provided in synchronization with the VR contents provided by the VR contents playing device 300. For example, if the virtual reality contents playing devices 300a to 300c provide images related to riding a roller coaster, the motion simulator 400 may control the posture of the seat to be changed depending on the images of the roller coasters going upward or downward.

As shown in FIG. 2, one motion simulator 400 may be provided to allow one cybernaut to be seated therein. Instead, one motion simulator 400 may be provided to allow a plurality of cybernauts to be seated therein together as described later with reference to FIG. 5.

Hereinafter, the VR contents playing device 300 and the motion simulator 400 are also referred to as a content providing device.

Figure 3:
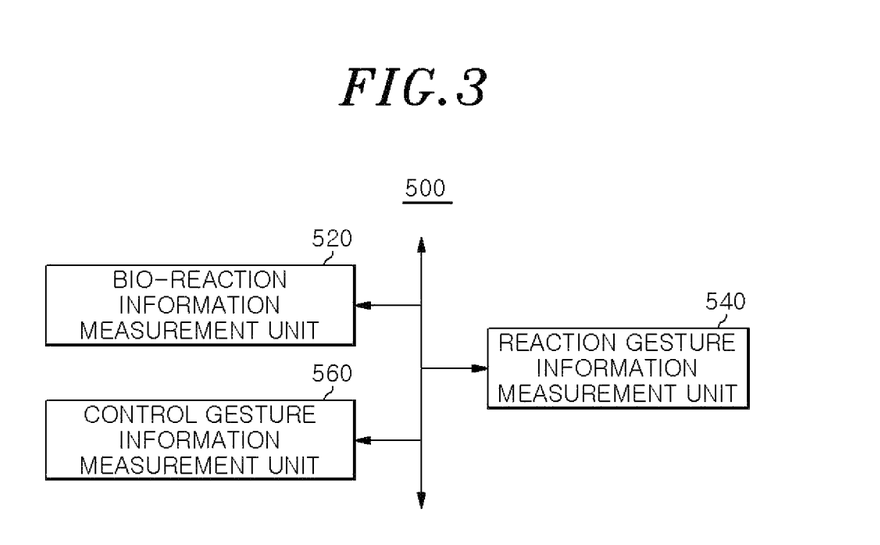
FIG. 3 illustrates a block diagram of one of the sensors shown in FIG. 2.

The sensors 500a to 500c (hereinafter, also collectively referred to as a sensor 500) acquire body information (or biometric information) on the bodies of cybernauts 20. FIG. 3 illustrates a block diagram of the sensor. Referring to FIG. 3, the sensor 500 may include a bio-reaction information measurement unit 520, a reaction gesture information measurement unit 540 and a control gesture information measurement unit 560, but is not limited thereto. Moreover, the sensor 500 may include a communication unit for sending and receiving data, which includes acquired body information to/from other communication objects, for example, the control unit 100 (see FIG. 2).

The bio-reaction information measurement unit 520 measures bio-reactions of cybernaut's body, for example, heart rates, pulse rates, ECG (electrocardiogram) or body temperature when the cybernaut 20 experiences virtual reality contents. The bio-reaction information measurement unit 520 may include various sensors (heart rate sensor, pulse rate counter, ECG monitor, clinical thermometer, etc.) for measuring bio-reactions described above. Measured bio-reactions are created as bio-reaction information.

The reaction gesture information measurement unit 540 measures cybernaut's body motions when the cybernaut 20 experiences virtual reality contents, for example, head motions, gestures, actions of arms or legs (hereinafter, referred to as reaction gestures). The reaction gesture information measurement unit 540 may include various sensors for measuring body gestures described above. The measured gestures are created as reaction gesture information.

The control gesture information measurement unit 560 measures gestures of the cybernaut 20 and determines whether the measured gestures are predefined gestures (hereinafter, referred to as control gestures). The control gesture information measurement unit 560 may include various sensors for measuring body gestures described above. The measured gestures are created as control gesture information.

Each of the reaction gesture information measurement unit 540 and the control gesture information measurement unit 560 may decide whether the measured gestures are the reaction gesture or the control gesture. For example, each of the reaction gesture information measurement unit 540 and the control gesture information measurement unit 560 may include a recognition unit for recognizing measured gestures, and mapping information for deciding whether the recognized gestures are the reaction gestures or the control gestures. Accordingly, whether the measured gestures are the reaction gesture or the control gesture may be decided by the recognition unit using the mapping information.

However, it is just an example that the reaction gesture information measurement unit 540 and the control gesture information measurement unit 560 decide whether a measured gesture is the reaction gesture or the control gesture, and other types of decision may be made. For example, the gestures of the cybernaut 20 may be neither measured by the reaction gesture information measurement unit 540 nor the control gesture information measurement unit 560, but measured by a gesture measurement unit (not shown) which may be included in the sensor 500. In addition, in case that the gestures of the cybernaut 20 may be measured by the gesture measurement unit, the information on the gesture measured by the gesture measurement unit may be sent to the control unit 100. The control unit 100 may be decide whether the measured gesture is the reaction gesture or the controlling gesture. In this case, the control unit 100 may include a recognition unit for recognizing gestures, and mapping information for deciding whether the recognized gestures are the reaction gestures or the control gestures. Whether the measured gestures are the reaction gestures or the control gesture may be decided by the recognition unit using the mapping information.

Referring again to FIG. 2, the control unit 100 is connected to the VR contents playing devices 300a to 300c, the motion simulators 400a to 400c, and the sensors 500a to 500c.

The control unit 100 controls the images provided by the VR contents playing device 300 to synchronize with the motions provided by the motion simulator 400. In addition, the control unit 100 receives biometric information from the sensors 500a to 500c, calculate reaction value for the cybernauts 21 to 23 based on the biometric information every predetermined time interval, determine property information for the VR content to be played based on the reaction value, and control the VR contents playing devices 300a to 300c to play VR content having the determined property information. The control unit 100 may be implemented by a memory for storing instructions programmed to execute the functions described above and those described below and a microprocessor for executing the instructions.

The control unit 100 receives, from the sensor 500 biometric information (body information), which is obtained by the sensor 500 when the cybernaut 20 has experienced virtual reality contents. The body information includes at least one of bio-reaction information, reaction gesture information and control gesture information. Since the information included in the body information is already described above, detailed description of the information will be hereinafter omitted. The control unit may include a communication module for sending/receiving data.

The control unit 100 calculates reaction value for the cybernaut 20 based on the received body information every predetermined time interval. The control unit 100 may store mapping data mapping the body information with the reaction values.

An exemplary process of calculating the reaction value by the control unit 100 is described for the case that a pulse rate is included as bio-reaction information in the received body information. The control unit 100 may store mapping data. If a reference value of the pulse rate is set to 120 in the mapping data and the received pulse rate is above the reference value, the control unit 100 calculates the reaction value by using the mapping data so that the reaction value indicates the cybernaut 20 feels fear of the virtual reality contents.

Further, another exemplary process of calculating the reaction value by the control unit 100 is described for the case that an angle of eye direction of a cybernaut is included as reaction gesture information in the received body information. If the measured angle of eye direction of the cybernaut is within 20 degrees with respect to the vertical downward, the control unit 100 may analyze that the cybernaut 20 feels comfortable about the virtual reality contents. Thus, the control unit 100 may calculate the reaction value by using the mapping data and the analyzed results so that the reaction value indicates the cybernaut 20 feels comfort of the virtual reality contents. The method of analysis by the control unit 100 may be applied to other reaction gesture information, and it should be noted that the method of analysis is not limited to the method described above.

Figure 4:
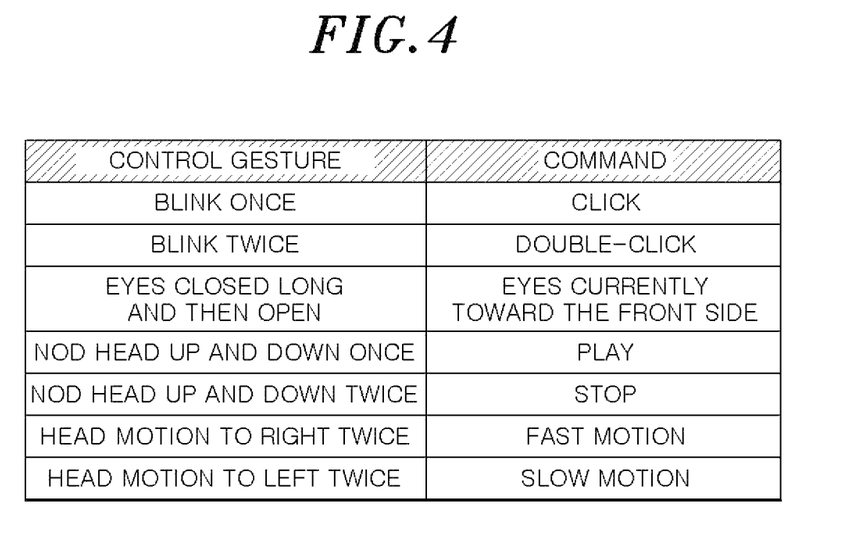
FIG. 4 illustrates an exemplary table included in a control unit shown in FIG. 2 for mapping cybernaut's control gestures with commands for virtual reality contents.

Further, another exemplary process of analyzing cybernaut's intent to control virtual reality contents by the control unit 100 is described below for the case that the body information received by the control unit 100 includes control gesture information. The control unit 100 may store mapping data in which control gestures are mapped with the intents (commands) of cybernaut 10 to control. FIG. 4 illustrates exemplary mapping data stored in the control unit 100. Referring to FIG. 4, control gestures are mapped with commands related to images. When the reaction gesture information in the body information received by control unit 100 includes nodding the head up and down once, the control unit 100 analyzes that the cybernaut 20 intends to 'play' images on the basis of the mapping data shown in FIG. 4. In this regard, the control gestures shown in FIG. 4 are based on body gestures of the cybernaut 20.

The control unit 100 determines property information, which represents the characteristics of the VR contents to be provided to the cybernaut 10. The property information may include at least one of playing speed of the VR contents, a size of an object in the VR contents, an amount of motions of an object in the VR contents, and amounts of the motions provided by the motion simulator 400.

The control unit 100 determines property information by using the method as follows: first, the control unit 100 checks if the reaction value is within a predetermined range. If the reaction value is within the predetermined range, the control unit 100 determines that property information do not need to be changed. Otherwise, the control unit 100 determines that property information should be adjusted so that the reaction value is changed within the predetermined range.

The control unit 100 controls at least one of the VR contents playing devices 300 and the motion simulator 400 based on the calculated reaction value. More specifically, the control unit 100 determines how to change at least one of the VR contents to be provided and the motions to be provided on the basis of the calculated reaction value.

When the control unit 100 determines property information for the VR contents to be played, the control unit 100 controls the VR contents playing device 300 to play VR contents having the determined property information. For example, the control unit 100 may request the VR contents playing device 300 which includes VR contents corresponding to the determined property information, to play the VR contents having the determined property information.

Therefore, in accordance with the embodiment, it is possible to control virtual reality contents to be provided so as to mitigate cybernaut's uncomfortable feeling if the cybernaut feels extremely uncomfortable. That is, the cybernaut may be provided with optimum virtual reality contents depending on his/her state.

Meanwhile, the control unit 100 controls at least one of the VR contents playing device 300 and the motion simulator 400 based on the intent of the cybernaut 20 (e.g., commands shown in FIG. 4) analyzed by the control unit 100. More specifically, the control unit 100 sends the command extracted from the gestures of the cybernaut 20 to at least one of the VR contents playing device 300 and the motion simulator 400. The VR contents playing device 300 or the motion simulator 400 controls the image or the motion to be provided in accordance with the received command.

Therefore, in accordance with the embodiment, the cybernaut may control or operate virtual reality contents provided to his/her just by means of own body gestures even without additional operation.

Meanwhile, as shown in FIG. 2, there may be a plurality of cybernauts 21 to 23. In this case, each of the VR contents playing devices 300a to 300c and each of the motion simulators 400a to 400c may be assigned to each of the plurality of cybernauts 21 to 23. Similarly, each of the sensors 500a to 500c may also be assigned to each of the cybernauts 21 to 23.

In this case, the control unit 100 receives biometric information of the respective cybernauts 21 to 23 from the sensor 500a to 500c, calculates respective reaction values for each of the cybernauts 21 to 23 based on the received biometric information every predetermined time interval, determines property information for each VR content to be played based on the corresponding reaction value, and control each VR contents playing devices 300 to play its VR content having the determined property information.

Therefore, in accordance with the embodiment, the cybernauts may be provided with optimum virtual reality contents depending on their own reactions.

Meanwhile, in another example, each of the VR contents playing devices 300a to 300c and each of the sensors 500a to 500c are assigned to each one of the cybernauts 21 to 23, and one motion simulator may be assigned to all of the cybernauts 21 to 23 unlike the example shown in FIG. 2. Hereinafter, the another example will be described in more detail with reference to FIG. 5.

Figure 5:
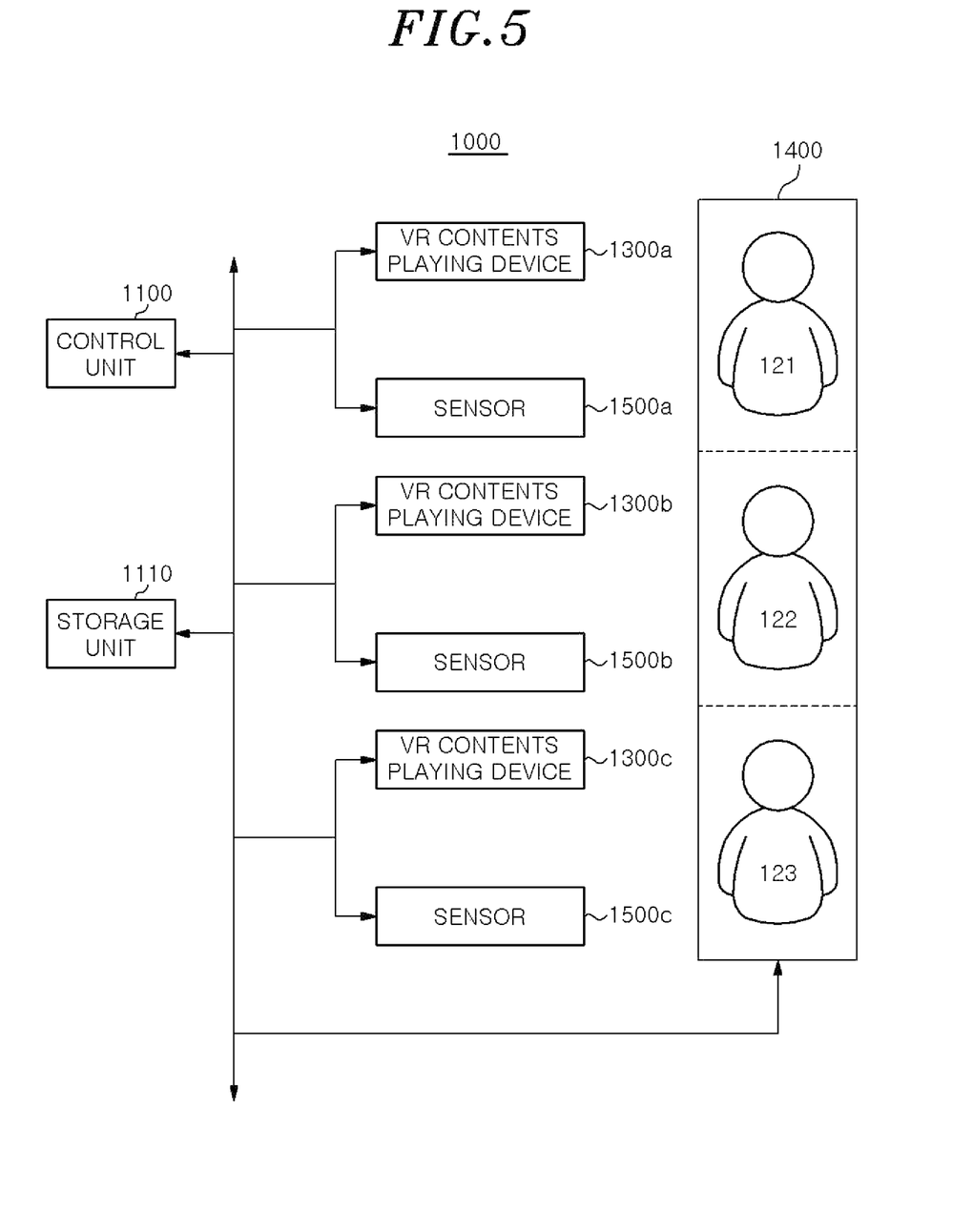
FIG. 5 depicts an exemplary system including VR contents playing devices, sensors, a motion simulator, a storage unit and a control unit in accordance with another embodiment.

FIG. 5 depicts an exemplary system including VR contents playing devices, sensors, motion simulators, a storage unit and a control unit in accordance with an embodiment.

With reference to FIG. 5, except that one motion simulator 1400 is assigned to all of the cybernauts 121 to 123, the other configurations are the same as those shown in FIG. 2.

The sensors 1500a to 1500c obtain body information (biometric information) from the respective cybernauts 121 to 123. The control unit 1100 receives the body information from the respective sensors 1500a to 1500c. The control unit 1100 calculates the respective reactions values of each of cybernauts 121 to 123 based on the body information, determine property information for each VR content to be played based on the corresponding reaction value, and control each VR contents playing device 1300a to 1300c to play its VR content having the determined property information.

Each of cybernauts 121 to 123 may be provided with images depending on his/her reactions. Since the method of calculating the respective reaction values, determining property information and controlling the VR contents playing devices 1300a to 1300c are already described above, description therefor will be omitted.

In addition, since just one motion simulator 1400 is provided to the cybernauts 121 to 123, the same motions are provided to the cybernauts 121 to 123.

In this case, the control unit 1100 may calculate a motion value based on the reaction values of the cybernauts 121 to 123. In this case, the control unit 1100 may calculate the motion value in consideration of distribution of such reaction values.

For example, the control unit 100 calculates the motion value based on whether or not a mean value of the reaction values of the cybernauts 121 to 123 seated in one motion simulator 1400 is within a predetermined range. When the mean value of the reaction values is within the predetermined range, the control unit 1100 may calculate the motion value so that the motion value indicates the cybernauts 121 to 123 feel comfort of the virtual reality contents.

Then, the control unit 1100 determines property information with related to the motion provided by the motion simulator 1400, in consideration of the motion value by using the method as follows: first, the control unit 1100 checks if the motion value is within a predetermined range. If the motion value is within the predetermined range, the control unit 1100 determines that property information does not need to be adjusted. Otherwise, the control unit 1100 determines that property information should be adjusted so that the reaction value is changed within the predetermined range.

Therefore, in accordance with the embodiment, in the case where one motion simulator is provided to all of them, it is possible to control the motion simulator 1400 to provide a motion optimal to all of the cybernauts based on their reaction.

Figure 6:
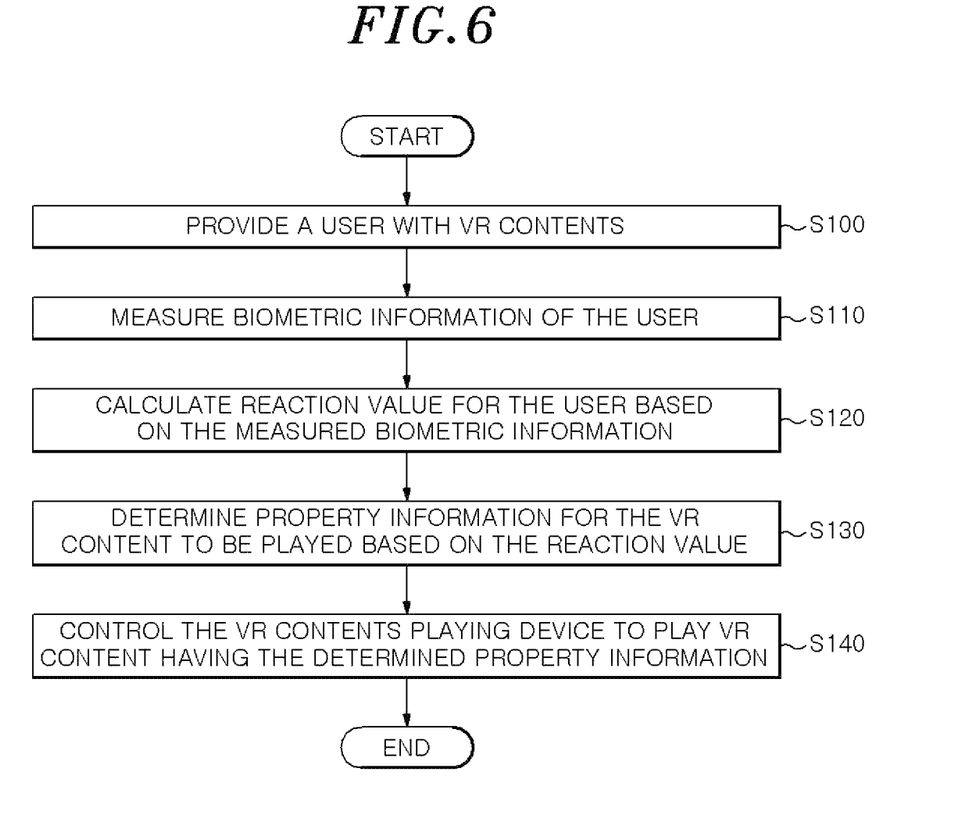
FIG. 6 shows a flow chart of a method for providing VR contents in accordance with an embodiment.

FIG. 6 illustrates a flow chart of the method for controlling virtual reality contents in accordance with an embodiment. Referring to FIG. 6, the method for controlling virtual reality contents includes step S100 of providing a user with a VR content among a plurality of VR contents, each of the VR contents having at least one property information thereof; step s110 of measuring biometric information of the user; step S120 of calculating reaction value for the user based on the measured biometric information every predetermined time interval; step s130 of determining property information for the VR content to be played based on the reaction value; and step s140 of controlling the VR contents playing device to play VR content having the determined property information.

Meanwhile, the method shown in FIG. 6 can be carried out by the control unit 100 shown in FIG. 2. Therefore, since description of the method for controlling virtual reality contents is similar to the description of the control unit 100, the redundant description will be thus omitted.

As described above, in accordance with the embodiment, it is possible to analyze cybernaut's reactions to virtual reality contents based on body information, for example, heart rates or pulse rates, each of cybernauts who experience the virtual reality contents, and provide the cybernauts with different virtual reality contents based on their reactions. Therefore, the cybernauts may be provided with optimum virtual reality contents compatible with their own state.

Moreover, the cybernauts may control the virtual reality contents provided to them just with their own body motion without additional operation.

Meanwhile, the method for controlling virtual reality contents in accordance with the embodiment of the present disclosure may be implemented as a computer program stored in a computer-readable storage medium programmed to execute each operation included in the method, or in a computer-readable storage medium stored with a computer program for executing each operation included in the method.

The combinations of respective sequences of a flow diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create means for performing functions described in the respective sequences of the sequence diagram. Since the computer program instructions, in order to implement functions in specific manner, may be stored in a memory useable or readable by a computer or a computer for other programmable data processing apparatus, the instruction stored in the memory useable or readable by a computer may produce manufacturing items including an instruction means for performing functions described in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective sequences of the flow diagram.

Moreover, the respective sequences may indicate some of modules, segments, or codes including at least one executable instruction for executing a specific logical function(s). In some alternative embodiments, it is noted that the functions described in the sequences may run out of order. For example, two consecutive sequences may be substantially executed simultaneously or often in reverse order according to corresponding functions.

The explanation as set forth above is merely described a technical idea of the exemplary embodiments of the present disclosure, and it will be understood by those skilled in the art to which this present disclosure belongs that various changes and modifications may be made without departing from the scope of the characteristics of the embodiments of the present disclosure. Therefore, the exemplary embodiments disclosed herein are not used to limit the technical idea of the present disclosure, but to explain the present disclosure, and the scope of the technical idea of the present disclosure is not limited to these embodiments. Therefore, the scope of protection of the present disclosure should be construed as defined in the following claims and changes, modifications and equivalents that fall within the technical idea of the present disclosure are intended to be embraced by the scope of the claims of the present disclosure.

In accordance with the present disclosure, it is possible to prevent performance deterioration of a server while improving communication speed of the server including a plurality of virtual machines.

What is claimed is:

1. A virtual reality (VR) contents providing system, comprising:
    a storage unit for storing a plurality of VR contents, each of the VR contents having at least one property information thereof;
    a first VR contents playing device for providing a first VR content among the VR contents;
    a first sensor for measuring first biometric information of a first user who experiences the first VR content currently playing through the VR contents playing device, wherein the first biometric information includes first bio-reaction information that is obtained by measuring bio-reactions of the first user's body by the first sensor while the first user experiences the first VR content;
    a second VR contents playing device for providing a second VR content among the VR contents;
    a second sensor for measuring second biometric information of a second user who experiences the second VR content currently playing through the second VR contents playing device, wherein the second biometric information includes second bio-reaction information that is obtained by measuring bio-reactions of the second user's body by the second sensor while the second user experiences the second VR content;
    a motion simulator, for generating a motion, in which the first user and the second user are seated such that the same motion is provided to the first user and the second user; and
    a control unit configured to receive the first bio-reaction information of the first user who experiences the first VR content from the first sensor, calculate first reaction value for the first user based on the first bio-reaction information of the first user every predetermined time interval, determine first property information for the first VR content based on the first reaction value, and control the VR contents playing device to play the first VR content having the first property information;
    wherein the control unit is configured to receive the second bio-reaction information of the second user who experiences the second VR content, calculate second reaction value for the second user based on the second bio-reaction information of the second user every predetermined time interval, determine second property information for the second VR content based on the second reaction value, and control the second VR contents playing device to play the second VR content having the second property information,
    wherein, the control unit is configured to calculate a motion value based on the first reaction value and the second reaction value and control the motion simulator based on the motion value, and
    wherein the control unit is further configured to calculate the motion value based on whether mean value of the first reaction value and the second reaction value is within a predetermined range, within which the first user and the second user feel comfort while sitting in the motion simulator, to provide the same motion to the first user and the second user.

2. The VR contents providing system of claim 1, wherein the control unit determines each of the first property information and the second property information by:
    checking if the first reaction value and the second reaction value are within the predetermined range, respectively, and
    if the first reaction value and the second reaction value are within the predetermined range, maintaining the first property information and the second property information, and
    if at least one of the first reaction value and the second reaction value is not within the predetermined range, adjusting said at least one of the first property information and the second property information so that said at least one of the first reaction value and the second reaction value is changed within the predetermined range.

3. The VR contents providing system of claim 1, wherein the first property information and the second property information comprise a playing speed of the VR contents, and amounts of the motions provided by the motion simulator.

4. The VR contents providing system of claim 1, wherein the first VR contents playing device and the second VR contents playing device include a head mounted display (HMD).

5. The VR contents providing system of claim 1, wherein the motion simulator is configured to provide the first user and the second user with three-dimensional movement.

6. The VR contents providing system of claim 1, wherein the first bio-reaction information and the second bio-reaction information include at least one of heart rates, pulse rates, electrocardiogram and body temperatures.

7. A virtual reality (VR) contents providing method performed by VR contents providing system having VR contents playing devices and sensors, comprising:
    providing a first user with a first VR content and a second user with a second VR content among the VR contents, each of the VR contents having at least one property information thereof;
    measuring first biometric information of the first user who experiences the first VR content currently playing through the first VR contents playing device, wherein the first biometric information includes first bio-reaction information that is obtained by measuring bio-reactions of the first user's body by a first sensor while the first user experiences the first VR content;

measuring second biometric information of the second user who experiences the second VR content currently playing through the second VR contents playing device, wherein the second biometric information includes second bio-reaction information that is obtained by measuring bio-reactions of the second user's body by the second sensor while the second user experiences the second VR content;

calculating first reaction value for the first user based on the first bio-reaction information of the first user who experiences the first VR content information every predetermined time interval;

calculating second reaction value for the second user based on the second bio-reaction information of the second user who experiences the second VR content every predetermined time interval;

determining first property information for the first VR content based on the first reaction value; and determining second property information for the second VR content based on the second reaction value;

controlling the first VR contents playing device to play the first VR content having the first property information;

controlling the second VR contents playing device to play the second VR content having the second property information;

providing the first user and the second user with a motion generated by a motion simulator in which the first user and the second user are seated;

calculating a motion value based on the first reaction value and the second reaction value; and controlling the motion simulator based on the motion value, wherein the calculating the motion value is further based on whether mean value of the first reaction value and the second reaction value is within a predetermined range, within which the first user and the second user feel comfort while sitting in the motion simulator, to provide the same motion to the first user and the second user.

8. The VR contents providing method of claim 7, wherein the determining each of the first property information and the second property information comprises:

checking if the first reaction value and the second reaction value are within the predetermined range, respectively;

if the first reaction value and the second reaction value are within the predetermined range, maintaining the first property information and the second property information, and if at least one of the first reaction value and the second reaction value is not within the predetermined range, adjusting said at least one of the first property information and the second property information so that said at least one of the first reaction value and the second reaction value is changed within the predetermined range.

9. The VR contents providing method of claim 7, wherein the first property information and the second property information comprise a playing speed of the VR contents, and amounts of the motions provided by the motion simulator.

10. The VR contents providing method of claim 7, wherein the first VR contents playing device and the second VR contents playing device include a head mounted display (HMD).

11. The VR contents providing method of claim 7, wherein the motion simulator is configured to provide three-dimensional movement with the first user and the second user.

12. The VR contents providing method of claim 7, wherein the first bio-reaction information and the second bio-reaction information include at least one of heart rates, pulse rates, electrocardiogram and body temperatures.

* * * * *